United States Patent Office 2,874,041
Patented Feb. 17, 1959

2,874,041

PROCESS OF ZINC EXTRACTION FROM ORES FORMED BY OR CONTAINING ZINC SILICATE OR OTHER SOLUBLE SILICATES, BY MEANS OF HYDROMETALLURGY

Hugo Lodewijk Radino, Rio de Janeiro, Brazil, assignor of fifty percent to Companhia Mercantil e Industrial Inga, Rio de Janeiro, Brazil, a corporation of Brazil No Drawing. Application March 27, 1957
Serial No. 648,779

Claims priority, application Brazil April 4, 1956

14 Claims. (Cl. 75—120)

The present invention relates to a process of zinc extraction from ores formed by or containing zinc silicate or other soluble silicates, by means of hydrometallurgy.

At present the ore usually employed for zinc extraction is the sulfide (blende or spharelite), whether through pyrometallurgy or hydrometallurgy. In a smaller scale zinc carbonate (smithsonite or calamine) and zinc oxide (zincite) are also used. It should be remembered that under the general name of calamine (the mineralogic name for zinc silicate) several zinc carbonate ores with different proportions of zinc silicate are currently grouped together.

Zinc hydrometallurgy starting from zinc ores shows serious difficulties when the ores bear some soluble silicates likely to produce, on leaching solutions containing 2 to 3 percent soluble silica, approximately. This is due to the formation of silicic acid during the sulfuric acid leaching. The silicic acid has to be disposed of before the solution containing zinc sulfate is processed in order to eliminate impurities that considerably reduce the electric current efficiency during the subsequent electrolysis. The elimination of the silica can be carried out only by the neutralization of the solution, a hard to be filtered silica gel being then formed.

For the treatment of such ores several techniques are used in order to avoid the difficulty just mentioned. One of these is the reverse leaching, in which the charge of the electrolyzed solution containing free sulfuric acid is gradually poured over the ore pulp, the pH value being carefully controlled in order to avoid the dissolution of the soluble silicates, the zinc counterpart not being thereby extracted. Another technique consists of concomitantly precipitating silica and ferric hydroxide starting from the ferric ion out of the ore itself or added as ferric sulfate obtained by treating iron scrap with part of the electrolyzed solution followed by the oxidation of bivalent iron through manganese dioxide. Still another technique, when blende ore is used, specially when the blende ore contains quartz gangue, consists of conveniently controlling roasting in order to avoid soluble silicate formation. This requires a very accurate control of roasting temperature.

However, when the zinc ore contains a relatively high or even a predominant proportion of soluble silicates, no such techniques can be adopted because the resulting solutions would bear a too high concentration of silicic acid. Under the circumstances the sole procedure is to grade the ore by flotation, to eliminate the silicated constituent itself. This method is used by a large zinc producer, the Rhodesia-Broken Hill Development Co., which turns out about 70 tons per day. The zinc silicate thus separated has not to this day been used for lack of a practical leaching method. We wish to stress this point, and therefore quote a sentence from the book "Hydrometallurgy of Base Metals," by George D. Van Arsdale (page 17, McGraw-Hill Book Company, Inc., 1st edition, 1953): "Carbonate and silicate ores have yet to be handled with complete success and perhaps a leaching method will some day prove suitable for treating them."

The present invention is particularly designed to handle high-grade soluble silicate ores by means of an extremely simple leaching method. The invention is equally successful with low-grade soluble silicate ores, such as those now used in zinc hydrometallurgy, during the silica coagulation stage.

The main advantage of the present invention is that it renders possible the handling, by hydrometallurgy of zinc ores containing soluble silicates, which are quite abundantly found in nature and show relatively high zinc grades (40 percent and even more). Another advantage of the present invention is that it makes possible the direct leaching of such ores through a simple and economical method. Still other advantages may be inferred from the description of the method, given further on.

The use of zinc ores containing soluble silicates has always held out tempting possibilities for hydrometallurgy, in face, of their relative abundance in nature, high zinc grades and their being easily attacked by sulfuric acid solutions in the concentrations usually adopted in hydrometallurgy methods, i. e., about 100 to 300 grammes of $H_2SO_4$ per liter.

Several coagulants have been used in attempting to coagulate silica into a filterable form. Ferric hydroxide received most attention.

Yet two great obstacles have always presented themselves, no matter what proportions of iron or methods of treatment where used: too slow filtration and a too large amount of precipitate, causing the retention of substantial amounts of zinc sulfate during the conditioning of solutions containing concentrations of 20 grammes per liter or more of soluble silica.

Going over past researches in this field we have similarly met with far from encouraging results. However, during our research work, we have found that on addition of relatively small proportions of aluminum sulfate (about 40 to 90 percent in relation to soluble silica) extraordinarily fast filtrations resulted, while the amounts of precipitates were quite satisfactory. We have also found that beyond some proportion of aluminum sulfate there was little or no reduction in the amount of precipitate; all the contrary, for there was a gradual increase in the amount of precipitate or filter cake as the proportion of aluminum sulfate increased; meanwhile optimum filtration speeds were observed. The improvement the use of aluminum sulfate as a coagulant brings about is better understood when we remember that the Rhodesia-Broken Hill Development Co. has to grade its ores in order to eliminate most of the soluble silicates, and even then it finds difficulties in the step of eliminating the silica that unavoidably gets into solution. In that company installations, the silica granulation, after the ore leaching, is made by means of ferric hydroxide through neutralization of the solution and heating at approximately 60° C. The silica conditioning is considered satisfactory when 250 ml. of the suspension can be filtered in 8 minutes through a Büchner funnel approximately 10 cm. in diameter. We have no information as to the vacuum and the kind of filter paper used in the test.

We have treated by our method an ore containing 25% silica, of which approximately 95% were soluble in 5% sulfuric acid. About 40 to 60% aluminum sulfate containing 17.5% $Al_2O_3$ in relation to the silica in the ore were added. Leaching and conditioning time totalled 30 minutes, at 95 to 100° C. Filtrations of 300 ml. of the suspension took about 2 minutes only. A Büchner funnel of the same diameter was used, with a S & S blue ribbon filter paper, and a 25 cm. mercury pressure reduction. Time was computed till the cake cracked.

Under the above mentioned conditions—i. e., using a 5% sulfuric acid solution, 30 minutes leaching and conditioning, at 95 to 100° C., and with a 46% Zn and 24.7% $SiO_2$ ore, ground through a 200-mesh screen—filter cakes weighing five times more than the amount of ore used were obtained. Zinc recovered out of the employed ore was approximately 90% when the cake was washed with 50% of water in relation to the ore weight. Under the circumstances, the percentage of soluble silica in the filtered solution was more or less constant, at about 0.5 gramme per liter. With longer conditioning of the precipitate (1 to 2 hours the rate of soluble silica declined to 0.4 and 0.35 gramme per liter, respectively.

Also, it was found that the filtration speed and the volume of the precipitate were influenced by the amount of iron in solution during the leaching treatment. The higher the iron concentration in the solution before coagulation the larger the amount of aluminum sulfate to be added in order to keep constant the filtration speed.

Also, it was found that temperature during leaching ought to be the highest possible in order to permit a quick neutralization of the acid as well as a shorter delay between adding of the whole ore load on the one side, and obtaining the coagulation of the silica and a pH about 4.0 on the other. If lower temperatures are used it takes longer to reach a 4.0 pH, and consequently for the coagulation of the silica to begin. We also found that the coagulation pH works as a function of the aluminum sulfate concentration in the solution, for any concentration of aluminum sulfate, it is always necessary to reach a given pH for the coagulation, approximately 3.5–4.0. At lower temperatures it is difficult to quickly reach the required pH; however, the coagulation may be reached through neutralizing with limestone. Temperatures over 70° C. may be used although it is preferred to use a temperature within the range of 90° to 100° C.

An interesting feature observed was that the $SO_4$ radical itself, found in the aluminum sulfate, may be used to attack the zinc silicate; this was observed by determining the amount of zinc recovered in relation to the amount of sulfuric acid used.

In order to illustrate these points some examples are given below.

*Example I*

Ore composition.—ZnO, 58.4%; $SiO_2$, 24.7%; $Al_2O_3$, 2.18%; $Fe_2O_3$, 1.90%.

The tests made showed that approximately 30% of the aluminum oxide, about 20% of ferric oxide, and about 95% of the silica contained in the ore were dissolved during leaching. Such percentages were determined by analysis of an aliquot part taken out before the coagulation of the silica.

Treatment.—5% sulfuric acid containing the amounts of aluminum sulfate (17.5% $Al_2O_3$) shown in the table below; the ore was handled at 95–100° C., this temperature was maintained for 30 minutes after coagulation.

Filtration.—Filtration of 300 ml. of the suspension through a Büchner funnel approximately 10 cm. in diameter, with blue ribbon S & S filter paper; 25 mm. mercury pressure reduction; time computed till the filter cake cracked.

Attempt was made to filtrate a neutralized suspension to which no aluminum sulfate had been added; the filtration time was over 4 hours. Adding several amounts of ferric cation as a coagulant the filtration times were somewhat shorter, varying from one hour and a half to three hours.

| Experiment | Percent of aluminum sulfate in resulation to ore silica | Filtration time | Weight of cake, g. | Weight of cake/ weight of ore |
|---|---|---|---|---|
| 1 | 16.8 | 15 m | 160 | 6.7 |
| 2 | 21 | 10 m | 160 | 6.7 |
| 3 | 25 | 7 m | 160 | 6.7 |
| 4 | 30 | 3 m | 140 | 5.8 |
| 5 | 34 | 3 m | 130 | 5.4 |
| 6 | 42 | 2 m. 30 s | 125 | 5.2 |
| 7 | 50 | 2 m. 30 s | 120 | 5.0 |
| 8 | 58 | 1 m. 30 s | 120 | 5.0 |
| 9 | 67 | 2 m | 130 | 5.4 |
| 10 | 89 | 2 m | 130 | 5.4 |
| 11 | 101 | 2 m | 135 | 5.6 |

The above figures indicate that there is an optimum amount of aluminum sulfate to be used in relation to the ore silica, which makes for both shorter filtration times and lighter filter cake weights; for the above mentioned ore it was from 40 to 60% in relation to the ore silica.

*Example II*

Ore composition.—ZnO, 49.2%; $SiO_2$, 23.3%; $Al_2O_3$, 3.8%; $Fe_2O_3$, 8.7%.

The tests made showed that approximately the same amounts of alumina, ferric oxide and silica as shown in Example I got into solution.

Processing and filtration were identical to those of Example I.

| Experiment | Percent of aluminum sulfate in resulation to ore silica | Filtration time | Weight of cake, g. | Weight of cake/ weight of ore |
|---|---|---|---|---|
| 1 | 15 | 20 m | 250 | 8.8 |
| 2 | 19 | 15 m | 230 | 8.1 |
| 3 | 23 | 11 m | 220 | 7.7 |
| 4 | 26 | 8 m | 190 | 6.7 |
| 5 | 30 | 4 m | 170 | 6.0 |
| 6 | 38 | 3 m. 30 s | 160 | 5.6 |
| 7 | 45 | 3 m | 150 | 5.3 |
| 8 | 53 | 3 m | 145 | 5.1 |
| 9 | 60 | 3 m | 140 | 4.9 |
| 10 | 75 | 2 m. 30 s | 144 | 5.1 |
| 11 | 90 | 3 m | 150 | 5.3 |

The above table shows that small additions of aluminum sulfate do not bring about satisfactory results. However, as the proportion of aluminum sulfate increases the action of the iron in solution decreases, specially regarding the weight of the cake.

The discontinuous leaching of soluble silicate ores by the method described and illustrated above was not yet considered fully satisfactory because of the relatively large mass of filter cake in relation to the load of a high-grade soluble silicate ore. Under the circumstances, it was also found practically impossible to use Dorr-type mud thickeners, for example, for the decantation would be virtually nihil (about 5 to 15%). Another obstacle was the fact that the suspension gets relatively thick at the point where the silica coagulates; however, more fluid suspensions can be had by using a larger proportion of aluminum sulfate. Anyhow, the coagulated suspension had to be agitated by means of efficient and rather powerful gadgets. On the other hand, the method required the use of electrolysed solutions containing at the most 50 grammes approximately of free sulfuric acid per liter, inasmuch an increase of consistency of the suspension from the use of higher concentrations of free sulfuric acid might bring about working difficulties.

These obstacles were all removed through an entirely new method of ore leaching. It was experimentally found that a somewhat higher decantation plus a rather small filter cake resulted when diluted acid was added to a previously neutralized suspension while the silica already was coagulated; the filtration speed was relatively low, though.

After many experiments, exceptionally favorable results were obtained by means of alternate additions of acid and ore. This was perfectly feasible in practice, since the finely pulverized ore was quickly attacked by the more diluted sulfuric acid, now found in the leaching tank owing to dilution caused by neutralized acid charges remaining in the tank.

In other words, the steps were as follows: (1) Introduction into the leaching tank of an electrolyzed solution charge containing free sulfuric acid (10% $H_2SO_4$) and aluminum sulfate; heating it to approximately 90° C.; (2) neutralization by means of an ore load slightly in excess; heating it half an hour; (3) introduction of a new electrolyzed solution charge (same volume as in (1)); heating the suspension half an hour; (4) neutralization of the free sulfuric acid by means of a new ore load; heating it. And so on and so forth.

After the addition of a certain number of acid charges (always with aluminum sulfate) and ore loads, each new addition of the acid solution was preceded by removing a corresponding portion of the neutralized suspension, which was then filtered. The leaching tank was therefore kept at a constant level.

Several interesting features were observed, to wit: (1) since there was one or more neutralized acid charges in the reactor, there was no longer the almost instantaneous coagulation observed with the discontinuous method previously described; (2) the suspension turned gradually more fluid with the increase in the number of charges in the tank; after the fourth one, fluidity changed little; (3) decantation went faster and faster with the increase in the number of charges in the tank; (4) once in operation, that is, once a portion of the suspension was removed before the introduction of every new acid charge, the amount of the precipitate and that of the decanted solids grew gradually smaller, tending to a limit which was a function of both the temperature and the number of charges in the tank; (5) as the operation proceeded in a continuous form, sand-like friable and relatively dense grains begin to appear to a considerable extent.

According to the results reached, it seems that the silica grains, coagulated during a previous handling, work as nuclei for new granulations of silica in solution; as the process goes on there appears a great many hard grains of silica, much larger than ore particles, which quickly decant.

Another interesting feature is that in each new acid treatment of a neutralized suspension part of the aluminum and the iron precipitated by a previous treatment gets into solution again (about 40% for the iron and 60% for the aluminum). Therefore, the amount of aluminum sulfate to be added each time in order to maintain a certain filtration speed and the amount of precipitate may be correspondingly reduced.

It is probable that the good results thus obtained are due to a gradual rather than instantaneous coagulation of the silica, as happens during the discontinued handling of just one charge. Although better results are obtained as the number of treatment charges contained in the leaching tank increase, there is a limit to it, and that is the leaching tank's capacity necessary to hold what is left of the charges; another factor is the acid dilution, which lowers its neutralizing action over the ore; consequently, neutralization and coagulation take longer.

We have already mentioned the fact that suspensions removed from the leaching tank, when the process is in full swing, decant easily. It was attempted to send back part of the decanted mud to the leaching tank, while the rest was filtered; meanwhile the amounts of mud sent back to the tank and those filtered were regulated so as to keep an even mud level in the decanter too. This made for a new reduction of the volume of the filter cake, once the process was in full swing.

As pointed out, the decanter's mud is formed by both coarse, hard, sand-like grains and jelly-like grains. The coarse grains are denser and decant quicker, the silica recently coagulated remaining on top. The upper part of the decanted mud, that is, the one containing freshly precipitated silica still not subjected to several alternate treatments of acidulation and neutralization, was conveyed back to the tank, in other tests, while the denser and easier to filter mud, was filtrated. This resulted in filter cakes of smaller volume for a same given ore basis, while the process worked in full swing.

We will give below some working examples of the new method of our present invention.

Example III

In Examples III, IV and V the same ore was used, of identical composition as that of Example I.

In the present example the treatment conditions were as follows: Alternate introduction of three 10% sulfuric acid charges containing 0.66 gramme of 17.5% $Al_2O_3$ aluminum sulfate per 100 milliliters, and three ore loads; heating at 95–100° C. for 30 minutes after each acid or ore addition; removal of one third of the suspension volume held in the leaching tank before each new addition of an acid charge, starting from the third charge.

Filtration figures were obtained by filtering 300 milliliters of the neutralized suspension removed from the leaching tank; a Büchner funnel of approximately 10 cm. in diameter, with blue ribbon S & S filter paper, and 25 cm. pressure reduction, was used, the time being computed till the filter cake cracked.

| Filtration No. | Filtration time (seconds) | Filter cake weight (grammes) | Cake weight/ore weight |
|---|---|---|---|
| 1 | 186 | 128 | 2.8 |
| 2 | 140 | 106 | 2.3 |
| 3 | 110 | 72 | 1.6 |
| 4 | 92 | 64 | 1.4 |
| 5 | 87 | 70 | 1.5 |
| 6 | 89 | 65 | 1.4 |
| 7 | 85 | 70 | 1.5 |
| 8 | 80 | 67 | 1.4 |
| 9 | 84 | 60 | 1.3 |

Example IV

The circumstances were exactly the same as those of Example III, except that 10% sulfuric acid containing 1.33 grammes of aluminum sulfate (17.5% $Al_2O_3$) per 100 milliliters was used.

| Filtration No. | Filtration time (seconds) | Filter cake weight (grammes) | Cake weight/ore weight |
|---|---|---|---|
| 1 | 128 | 110 | 2.3 |
| 2 | 92 | 92 | 1.9 |
| 3 | 91 | 80 | 1.7 |
| 4 | 110 | 72 | 1.5 |
| 5 | 80 | 74 | 1.5 |
| 6 | 85 | 78 | 1.6 |
| 7 | 80 | 72 | 1.5 |
| 8 | 75 | 68 | 1.4 |

Example V

The circumstances were exactly the same as those of Example III, except that 10% sulfuric acid containing 2.0 grammes of aluminum sulfate (17.5% $Al_2O_3$) per 100 milliliters was used.

| Filtration No. | Filtration time (seconds) | Filter cake weight (grammes) | Cake weight/ore weight |
|---|---|---|---|
| 1 | 130 | 125 | 2.6 |
| 2 | 150 | 93 | 2.0 |
| 3 | 132 | 85 | 1.8 |
| 4 | 95 | 79 | 1.7 |
| 5 | 100 | 80 | 1.7 |
| 6 | 120 | 77 | 1.6 |
| 7 | 85 | 80 | 1.7 |
| 8 | 90 | 75 | 1.6 |

When leaching and coagulation are over, the residual concentration of soluble silica is about 0.25 gramme per liter, whenever the continuous method just described is used. When necessary, specially when the purification is carried out by means of powdered zinc and thus part of the silica in solution precipitates and makes it hard to filter the residue, the silica concentration may be lowered. To do it ferric ion or aluminum ion as a coagulant in a separate operation, are used. If necessary to remove it, it is possible to leave in solution part of the iron and of the aluminum required to coagulate the remainder of the silica to a degree of approximately 0.1 gramme per liter, which is about the conventional concentration permitted by the usual methods. To do it the pH of the solution, and specially the time allowed for the coagulation treatment should be well regulated.

After the removal of excess silica in solution, the usual purification treatments are followed to remove impurities from the solution, such as copper, cadmium, nickel, and cobalt, which otherwise would considerably lower the current efficiency.

In zinc hydrometallurgy it is customary to use leaching solutions containing approximately 10 to 30 percent $H_2SO_4$. In the method of the present invention it is also possible to use such concentrations, the only requirement being that of starting with lower concentrations and gradually increase them as the fluidity of the suspension in the leaching tank will permit it.

The present invention is also applicable to handling conventional ores containing such soluble silicates as to require the use of some techniques in order either to keep them from dissolving, or to promote the coagulation of the resulting soluble silica. In such cases it is advisable to allow larger amounts of silica to get into solution, with the result that the zinc originally contained in the ore is put to better use, to promote coagulation. This is easily done by adapting the leaching method to the method of our present invention, or else by the conventional method of coagulating the silica by means of iron or aluminum and then conveying part of the decanted mud back again to the leaching tank, while filtering exclusively the part that contains fully granulated and sand-like silica.

The preparation of aluminum sulfate is easy and economical by the conventional method. We have also found that it is possible to produce the aluminum ions required to coagulate the silica by treating finely powdered bauxite, or any aluminum ore containing alumina in easily soluble form with an electrolyzed solution containing free acid. This is done in a dissolution tank provided with agitation and heating. The amounts of ore continually added and its fineness are regulated as required in order to maintain the desired concentration of aluminum sulfate in the solution to be sent to the leaching tank. This is not the only means to provide aluminum ions. They also can be obtained by treating aluminum ore in the leaching tank itself during the acid conditioning; the aluminum ore may be ground together with the zinc ore.

Another important feature of the present invention is the fact that it is not always necessary to provide from an external source the aluminum ions indispensable to properly coagulate the silica: it will suffice that the ore itself contains such a degree of acid-soluble alumina as to allow aluminum ions to be formed, specially during the acid conditioning treatment, in a proportion sufficient to satisfactorily coagulate the silica. This feature was rendered evident in experiments carried out with the ore mentioned in Example I. The mere attack of the ore by a 5% sulfuric acid, and the use of a slight ore excess, at any temperature and with any length of heating after neutralization, would originate suspensions 300 milliliters of which would take two or more hours to get filtrated. However, the alternate treatment cuts down the time to merely 15 minutes, owing to heating in an acid medium, which makes for the dissolution of either a larger amount of alumina contained in the ore or of the aluminum precipitated or coagulated together with the silica in a previous operation. The experiments showed that the solutions presented a degree of aluminum ion corresponding to that of a dissolution of approximately 30 to 50% of the alumina contained in the ore. Therefore, it is evident that the proportion of aluminum ions to be provided from an external source is a function of the alumina contained in the particular ore under treatment; it also depends both on the degree of solubility of that particular alumina, and on the heating time in an acid medium.

Therefore, since it depends both on the degree of soluble alumina contained in the ore and on the treatment, there may be cases where no addition of aluminum ions may be necessary beyond those supplied by the ore itself.

To sum it up, the main innovation of the present method resides in its having shown that the presence of aluminum ions in the stages of leaching and neutralizing made for the coagulation of silica in solution, in an extremely convenient way. It further showed that the resulting coagulated and neutralized suspensions were easily filtrable, thus making for the use of ores that so far found no use in zinc hydrometallurgy. On the other hand it showed that the filtration residues thus obtained, on being washed retain almost nothing of the zinc in solution. It further showed that the presence of aluminum ions considerably improves the coagulation of soluble silica during the stage of purification of the solution after leaching, when one uses such ores as are at present employed in zinc hydrometallurgy.

Another important feature of the present invention is the alternate treatment of acidulation and neutralization, with concomitant removal of part of the coagulated suspension, which is sent to thickeners and filters, before introducing into the leaching tank every new charge of electrolyzed solution containing free acid. This makes for easy-to-decant suspensions and makes it possible to use mud thickeners, thus cutting down the job of filtration and the capacity of filters.

Still another feature of the invention is the sending back to the leaching tank of part of the decanted or thickened mud, specially so its less dense portion containing freshly coagulated silica. In the leaching tank it undergoes new alternate acidulation and neutralization treatments, thus considerably reducing the mass of wet filtration residue.

I claim:

1. In the method of recovering zinc from zinciferous materials involving the leaching of the zinciferous materials with a sulfuric acid solution to form a zinc-containing solution which subsequently is subjected to electrolysis for the electrodeposition of zinc therefrom; the improvement in reducing, prior to electrodeposition, the concentration in the solution of soluble silica, which silica reduces the efficiency of the electrodeposition process, which comprises maintaining in said solution at a temperature over 70° C. a quantity of aluminum ions sufficient to coagulate said soluble silica into an easily-filterable suspension, and filtering said zinc-containing solution from said suspension.

2. In the method of recovering zinc from zinciferous materials involving the leaching of the zinciferous materials with a sulfuric acid solution to form a zinc-containing solution which subsequently is subjected to electrolysis for the electrodeposition of zinc therefrom; the improvement in reducing, prior to electrodeposition, the concentration in the solution of soluble silica, which silica reduces the efficiency of the electrodeposition process, which comprises maintaining in said solution at a temperature of 95 to 100° C. a quantity of aluminum ions sufficient to coagulate said soluble silica into an easily-filterable suspension, and filtering said zinc-containing solution from said suspension.

3. In the method of recovering zinc from zinciferous materials involving the leaching of the zinciferous materials with a sulfuric acid solution to form a zinc-containing solution which subsequently is subjected to electrolysis for the electrodeposition of zinc therefrom; the improvement in reducing, prior to electrodeposition, the concentration in the solution of soluble silica, which silica reduces the efficiency of the electrodeposition process, which comprises adding to said zinciferous materials in said sulfuric acid solution an amount of aluminium sulfate sufficient to coagulate said soluble silica into an easily-filterable suspension, and filtering said zinc-containing solution from said suspension.

4. The improvement defined in claim 3 wherein the quantity of aluminum sulfate added to said solution is from 40–90% by weight of said soluble silica.

5. The improvement defined in claim 4 wherein the neutralization step is performed at a temperature of over 70° C.

6. The improvement defined in claim 4 wherein the neutralization step is performed at a temperature of 95 to 100° C.

7. In the method of recovering zinc from zinciferous materials involving the leaching of the zinciferous materials with a sulfuric acid solution to form a zinc-containing solution which subsequently is subjected to electrolysis for the electrodeposition of zinc therefrom; the improvement in reducing, prior to electrodeposition, the concentration in the solution of soluble silica, which silica reduces the efficiency of the electrodeposition process, which comprises adding an amount of zinciferous material to a sulfuric acid solution sufficient to bring the pH of said solution within the range of 3.5 to 4.0, maintaining in said solution at a temperature over 70° C. a quantity of aluminum ions sufficient to coagulate said soluble silica into an easily-filterable suspension and filtering said zinc-containing solution from said suspension.

8. The improvement defined in claim 7 wherein the temperature is within the range of 95–100° C.

9. The process of continuously extracting zinc from zinc ores as a zinc-containing solution, which solution will be subsequently subjected to electrolysis for the electrodeposition of zinc therefrom, said solution being substantially free of soluble silica which reduces the efficiency of said electrodeposition process comprising the steps of separately and alternately introducing a plurality of charges into a leaching tank with approximately a half hour interval between each charge, the temperature of the mixture within said tank being maintained at about 90° C., including (1) introducing a charge of sulfuric acid solution containing a predetermined amount of aluminum ions, (2) introducing a charge of zinc ore slightly in excess of the amount necessary to neutralize said acid solution, said aluminum ions being present in an amount sufficient to coagulate the soluble silica into a readily-filterable suspension, repeating the alternate introduction of said charges for the duration of the process, and periodically filtering a portion of said suspension to remove said zinc-containing solution.

10. The process as defined in claim 9 wherein said aluminum ions from said charges in addition to any aluminum ions originally contained in said zinc ore are sufficient to coagulate the soluble silica into a readily-filterable suspension.

11. The process of continuously extracting zinc from zinc ores as a zinc-containing solution, which solution will be subsequently subjected to electrolysis for the electrodeposition of zinc therefrom, said solution being substantially free of soluble silica which reduces the efficiency of said electrodeposition process, comprising the steps of separately and alternatively introducing a plurality of charges into a leaching tank with approximately a half hour interval between each charge, the temperature of the mixture within said tank being maintained at about 90° C., including (1) introducing a charge of sulfuric acid solution containing a predetermined amount of an aluminum salt, (2) introducing a charge of zinc ore slightly in excess of the amount necessary to neutralize said acid solution, said aluminum salt being present in an amount sufficient to coagulate the soluble silica into a readily-filterable suspension, repeating the alternate introduction of said charges for the duration of the process, and periodically filtering a portion of said suspension to remove said zinc-containing solution.

12. The process as defined in claim 11 wherein the aluminum salt is aluminum sulfate.

13. The process as defined in claim 12 wherein the introduction into said leaching tank of each new sulfuric acid solution charge is preceded by the removal from the leaching tank of a portion of said coagulated, readily-filterable suspension sufficient to always maintain in said tank an almost identical residual charge.

14. The process as defined in claim 12 wherein the residual remaining after said zinc-containing solution is filtered from said suspension is added to said leaching tank and recycled therein.

References Cited in the file of this patent

UNITED STATES PATENTS

| | | |
|---|---|---|
| 1,281,031 | Laist | Oct. 8, 1918 |
| 1,281,032 | Laist | Oct. 8, 1918 |
| 2,599,816 | Ellsworth | June 10, 1952 |